(12) United States Patent
Watanabe (10) Patent No.: US 7,693,843 B2
(45) Date of Patent: Apr. 6, 2010

(54) IMAGE MANAGEMENT APPARATUS AND IMAGE MANAGEMENT METHOD AS WELL AS PROGRAM AND STORAGE MEDIUM THEREFOR

(75) Inventor: Satoshi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 11/802,783

(22) Filed: May 24, 2007

(65) Prior Publication Data

US 2008/0046436 A1 Feb. 21, 2008

(30) Foreign Application Priority Data

May 24, 2006 (JP) ............... 2006-144252

(51) Int. Cl.
*G06F 7/00* (2006.01)
(52) U.S. Cl. ......................... 707/10; 358/527
(58) Field of Classification Search ............... 707/1–10; 358/505, 527, 1.1–1.18
See application file for complete search history.

(56) References Cited

U.S. PATENT DOCUMENTS

2003/0182324 A1* 9/2003 Satomi et al. ............... 707/203
2003/0189739 A1* 10/2003 Yamaguchi et al. ......... 358/527
2006/0294096 A1* 12/2006 Kraus et al. ..................... 707/6
2007/0156702 A1* 7/2007 Jain ............................. 707/10
2007/0177805 A1* 8/2007 Gallagher ................... 382/190

OTHER PUBLICATIONS

"Canon Image Gateway new registration and registration model addition method", <Step 2: new registration and addition of registration model>, [online] Apr. 1, 2006, <Canon Marketing Japan, Inc.>, [retrieved on May 1, 2006], Internet <URL:http://www.imagegateway.net/entry/ index.html (w/machine-generated translation).

* cited by examiner

*Primary Examiner*—Wilson Lee
(74) *Attorney, Agent, or Firm*—Fitzpatrick, Cella, Harper & Scinto (57) ABSTRACT

An information management apparatus which is capable of managing products owned by a user by making the products easily registered in a device on a network. A user ID is registered in correspondence with model information on an image-pickup device. The user ID is received from a user terminal. When it is determined that the uploading of the image is permitted, on the basis of the received user ID and the registered user ID, the image uploaded from the user terminal is stored. Model information on an image-pickup device used for photographing the image stored in the storing unit is acquired from attribute information of the image. When the model information corresponding to the acquired model information is not registered, the acquired model information is further registered in correspondence with the received user ID.

6 Claims, 10 Drawing Sheets

FIG. 2

USER MANAGEMENT INFORMATION TABLE 200

| ITEM | TYPE | |
|---|---|---|
| USER ID | INTEGER TYPE | ~201 |
| PASSWORD | CHARACTER TYPE | ~203 |

FIG. 3

USER OWNED PRODUCT INFORMATION TABLE 300

| ITEM | TYPE | |
|---|---|---|
| USER ID | INTEGER TYPE | ~301 |
| OWNED MODEL NAME | CHARACTER TYPE | ~302 |
| SERIAL NUMBER | CHARACTER TYPE | ~303 |
| PURCHASE DATE | DATE TYPE | ~304 |

FIG. 4

USER ALBUM INFORMATION TABLE 400

| ITEM | TYPE | |
|---|---|---|
| USER ID | INTEGER TYPE | 401 |
| ALBUM ID | INTEGER TYPE | 402 |

FIG. 5

ALBUM IMAGE INFORMATION TABLE 500

| ITEM | TYPE | |
|---|---|---|
| ALBUM ID | INTEGER TYPE | 501 |
| IMAGE ID | INTEGER TYPE | 502 |

FIG. 6

IMAGE INFORMATION TABLE 600

| ITEM | TYPE | |
|---|---|---|
| IMAGE ID | INTEGER TYPE | 601 |
| ORIGINAL IMAGE PATH | CHARACTER TYPE | 602 |
| THUMBNAIL IMAGE PATH | CHARACTER TYPE | 603 |
| IMAGE PICKUP MACHINE MODEL NAME | CHARACTER TYPE | 604 |

FIG. 7

PRINT RESULT INFORMATION TABLE 700

| ITEM | TYPE | |
|---|---|---|
| USER ID | INTEGER TYPE | 701 |
| PRINTED IMAGE ID | INTEGER TYPE | 702 |
| PRINT SHEET SIZE | CHARACTER TYPE | 703 |
| NUMBER OF PRINTED SHEETS | INTEGER TYPE | 704 |
| PRINTING MACHINE MODEL NAME | CHARACTER TYPE | 705 |

FIG. 8

PHOTOGRAPHED IMAGE ATTACHED INFORMATION TABLE 800

| ITEM | TYPE |
|---|---|
| PHOTOGRAPHED IMAGE ID | INTEGER TYPE |
| PHOTOGRAPHING DATE | DATE TYPE |
| IMAGE PICKUP MACHINE MODEL | CHARACTER TYPE |
| IMAGE PICKUP MACHINE MODEL SERIAL NUMBER | CHARACTER TYPE |
| OWNER INFORMATION | CHARACTER TYPE |

IMAGE MANAGEMENT APPARATUS AND IMAGE MANAGEMENT METHOD AS WELL AS PROGRAM AND STORAGE MEDIUM THEREFOR

BACKGROUND OF THE INVENTION

1. Field of the Invention

The present invention relates to an image management apparatus and an image management method adapted to manage product information and digital image data owned by a user with a computer connected by using communication environments such as the Internet, as well as to a program and a storage medium therefor.

2. Description of the Related Art

There is known a kind of information processing system (information providing service) utilizing communication infrastructure such as the Internet. The information processing system includes a server device on a network which provides a network service. The network service makes it possible for a user to upload image data photographed by the user using a digital camera to a storage area of the server device on the network, and to access the server device for browsing and printing the image data in a local environment when the user desires. A provider of the server device providing such network service is hereinafter referred to as "photosite".

Further, there is provided a service in which a image-pickup device such as a camera and a printing device such as a printer, that are owned by the user, are registered as owned product information in the photosite, and thereby various information about the image-pickup device and the printing device is supplied from the side of photosite.

In the above described conventional techniques, it is possible for the user to register the user's products only when the user oneself accesses a registration screen and the like (see "CANON IMAGE GATEWAY new registration and registration model addition method", <STEP 2: new registration and addition of registration model>, [online] Apr. 1, 2006, <Canon Marketing Japan, Inc.>, [retrieved on May 1, 2006], Internet <URL:http://www.imagegateway.net/entry/index.html>).

By acquiring much more information on the user's products, it is possible for the service providing side (photosite) to utilize the acquired information as the market information and the like. Further, it is also possible for the user receiving the service to receive much more useful information from the photosite by registering the user's products.

However, a system like the above described information processing system only allows the user to access the registration screen by the user's intention, and the user is required to manually input information necessary for the registration. This results in a problem that much time and labor are required for the input operation and hence many products cannot be registered.

SUMMARY OF THE INVENTION

The present invention provides an information management apparatus and an information management method, which is capable of managing products owned by a user by making the products easily registered in a device on a network, as well as a program and a storage medium.

In a first aspect of the present invention there is provided an image management apparatus comprising: a registering unit adapted to register a user ID in correspondence with model information on an image-pickup device; a receiving unit adapted to receive the user ID from a user terminal; a user determining unit adapted to determine whether or not uploading of an image from the user terminal is permitted, on the basis of the user ID received by the receiving unit and the user ID registered in the registering unit; a storing unit adapted, when the uploading of the image is permitted, to store the image uploaded from the user terminal; an acquiring unit adapted to acquire model information on an image-pickup device used for photographing the image stored in the storing unit from attribute information of the image; and a model determining unit adapted to determine whether or not model information corresponding to the model information acquired by the acquiring unit is registered in the registering unit in correspondence with the user ID received by the receiving unit, wherein when the model information is not registered in the registering unit, the registering unit further registers the model information acquired by the acquiring unit in correspondence with the user ID received by the receiving unit.

The image management apparatus can further comprises: a notifying unit adapted, when the model determining unit determines that the model information is not registered in the registering unit, to notify the user terminal of the model information acquired by the acquiring unit; and a selecting unit adapted to select whether or not to register the informed model information in the registering unit, according to an instruction from the user terminal, wherein when the selecting unit selects to register the notified model information in the registering unit, the registering unit further registers the model information acquired by the acquiring unit in correspondence with the user ID received by the receiving unit.

The image management apparatus can further comprises: a print instruction receiving unit adapted to receive a print instruction of the image stored in the storing unit from the user terminal; a downloading unit adapted to download the image instructed to be printed to the user terminal; and a print result receiving unit adapted to receive print result information of the downloaded image from the user terminal, wherein the registering unit further registers model information on a printing device included in the received print result information, in correspondence with the user ID received by the receiving unit.

In a second aspect of the present invention, there is provided an image management apparatus comprising: a user ID receiving unit adapted to receive a user ID from a user terminal; a determining unit adapted to determine whether or not uploading of an image from the user terminal is permitted, on the basis of the received user ID; a storing unit adapted, when the uploading of the image is permitted, to store the image uploaded from the user terminal; a print instruction receiving unit adapted to receive a print instruction of the image stored in the storing unit; a downloading unit adapted to download the image instructed to be printed to the user terminal; a print result receiving unit adapted to receive print result information of the downloaded image from the user terminal; and a registering unit adapted to register model information on a printing device included in the received print result information in correspondence with the user ID.

The image management apparatus can further comprises: a determining unit adapted to determine whether or not model information corresponding to the model information acquired by the acquiring unit is registered beforehand by the registering unit in correspondence with the user ID received by the user ID receiving unit, wherein when the determining unit determines that the model information acquired by the acquiring unit is not registered beforehand by the registering unit, the registering unit newly registers the model information acquired by the acquiring unit in correspondence with the user ID received by the user ID receiving unit.

In a third aspect of the present invention, there is provided an image management method comprising: a registering step of registering a user ID in correspondence with model information on an image-pickup device; a user ID receiving step of receiving the user ID from a user terminal; a determining step of determining whether or not uploading of an image from the user terminal is permitted, on the basis of the received user ID and the registered user ID; a storing step of, when the uploading of the image is permitted at the determining step, storing the image uploaded from the user terminal; an acquiring step of acquiring model information on an image-pickup device used for photographing the stored image from attribute information of the image; a model determining step of determining whether or not model information corresponding to the acquired model information is already registered in correspondence with the received user ID; and a registering step of, when the model information corresponding to the acquired model information is not registered, further registering the acquired model information in correspondence with the received user ID.

In a fourth aspect of the present invention, there is provided an image management method comprising: a user ID receiving step of receiving a user ID from a user terminal; a determining step of determining whether or not uploading of an image from the user terminal is permitted, on the basis of the received user ID; a storing step of, when the uploading of the image is permitted by the determining step, storing the image uploaded from the user terminal; a print instruction receiving step of receiving a print instruction of the stored image; a downloading step of downloading the image instructed to be printed to the user terminal; a print result receiving step of receiving print result information of the downloaded image from the user terminal; and a registering step of registering model information on a printing device included in the received print result information in correspondence with the user ID.

In a fifth aspect of the present invention, there is provided a program for causing a computer to perform an image management method, the image management method comprising: a registering step of registering a user ID in correspondence with model information on an image-pickup device; a user ID receiving step of receiving the user ID from a user terminal; a determining step of determining whether or not uploading of an image from the user terminal is permitted, on the basis of the received user ID and the registered user ID; a storing step of, when the uploading of the image is permitted, storing the image uploaded from the user terminal; an acquiring step of acquiring model information on an image-pickup device used for photographing the stored image from attribute information of the image; a model determining step of determining whether or not model information corresponding to the acquired model information is already registered in correspondence with the received user ID; and a registering step of, when model information corresponding to the acquired model information is not registered at the model determining step, further registering the acquired model information in correspondence with the received user ID.

In a sixth aspect of the present invention, there is provided another program causing a computer to perform an image management method, the image management method comprising: a user ID receiving step of receiving a user ID from a user terminal; a determining step of determining whether or not uploading of an image from the user terminal is permitted, on the basis of the received user ID; a storing step of, when the uploading of the image is permitted, storing the image uploaded from the user terminal; a print instruction receiving step of receiving a print instruction of the stored image; a downloading step of downloading the image instructed to be printed to the user terminal; a print result receiving step of receiving print result information of the downloaded image from the user terminal; and a registering step of registering model information on a printing device included in the received print result information in correspondence with the user ID.

In a seventh aspect of the present invention, there is provided a computer-readable storage medium storing the above-mentioned program.

In an eighth aspect of the present invention, there is provided a computer-readable storage medium storing the above-mentioned another program According to the present invention, it is capable of managing products owned by a user by making the products easily registered in the device on the network.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing preferred embodiment thereof.

Figure 1:
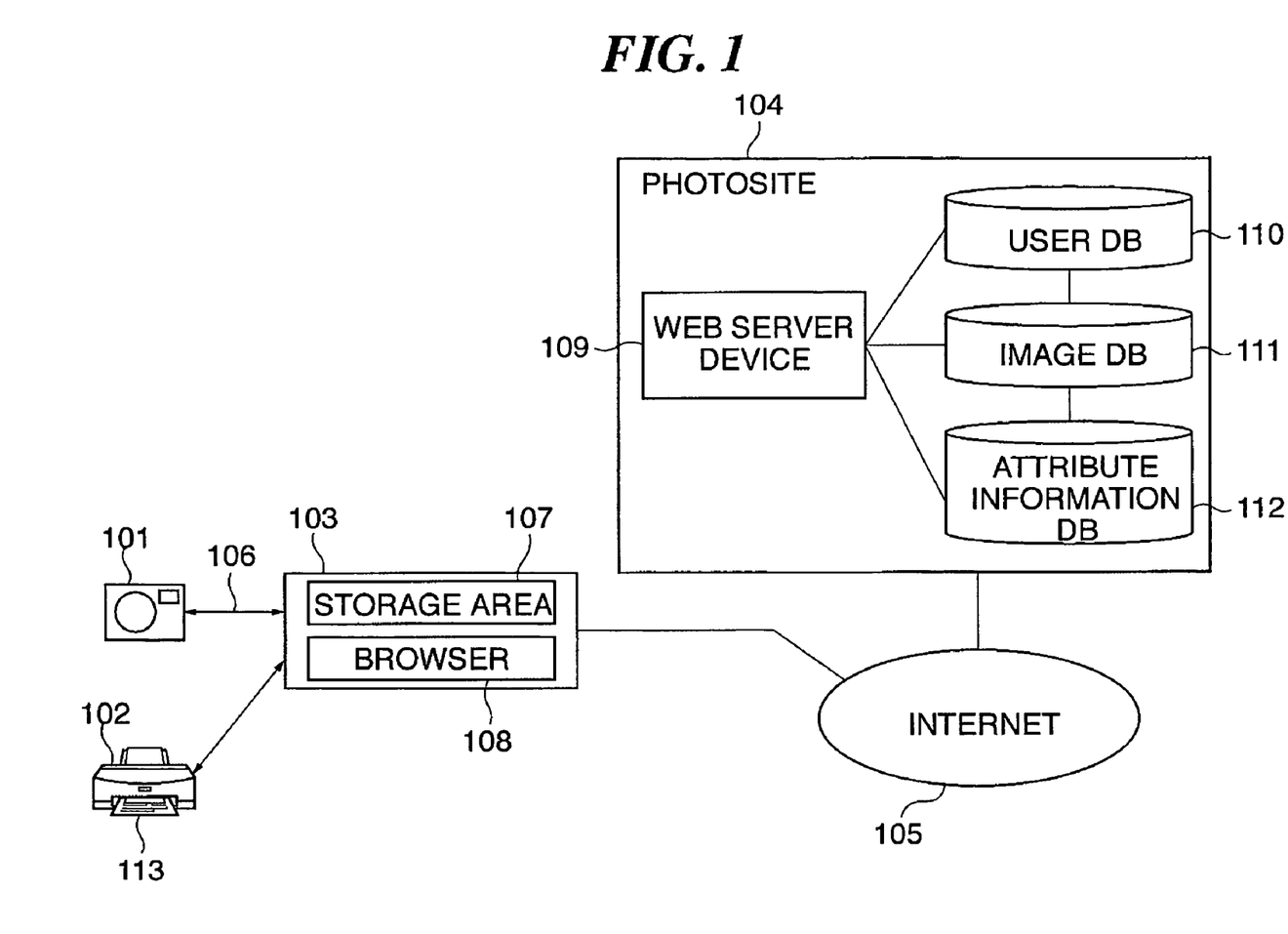
FIG. 1 is a view schematically showing a configuration of an information processing system including an image management apparatus according to an embodiment of the present invention.

FIG. 1 is a view schematically showing a configuration of an information processing system including an image management apparatus according to an embodiment of the present invention.

In the following description, a person who uploaded image data to the photosite on the Internet is referred to as "the owner user".

In FIG. 1, an information processing system is configured by connecting a personal computer (hereinafter referred to as "the user PC") 103, to which an image input apparatus 101 and a printer 102 are connected, to a Web server device 109 of a photosite 104 via the Internet 105.

The image input apparatus 101 and the user PC 103 are connected with each other via a data transfer interface 106. The user PC 103 has a storage area 107 in which a web browser 108 and an OS (Operating System) are installed. The photosite 104 has the Web server device 109, and a user database 110, an image database 111 and an attribute information database 112 which are connected to the Web server device 109. In the present embodiment, the entity which is simply described as a database is a storage medium or a storage device in which the above described various databases are stored.

The processing of flowcharts shown in FIGS. 9 to 12 as will be described below is executed by a CPU of the user PC 103 according to the OS, the Web browser 108 and various application programs, and also executed by a CPU of the Web server device 109 according to an OS and Web application programs.

The image input apparatus 101 includes, for example, a digital still camera capable of photographing a subject and recording the photographed still image as image data, and a digital video camera capable of recording moving images as image data. Further, the image input apparatus 101 includes a scanner capable of reading a document and recording the read still image as image data. In the image input apparatus 101, an optical image as image information is converted into electrical signals, and the electrical signals are subjected to predetermined processing and then recorded/reproduced as digital information.

As the data transfer interface 106 for transferring image data inputted by the image input apparatus 101 to the user PC 103, a wired system interface as represented by USB and IEEE 1394, or a wireless systems interface as represented by IrDA and Bluetooth is used.

The image data transmitted from the image input apparatus 101 to the user PC 103 via the data transfer interface 106 are stored in the storage area 107 of an information storage device as represented by an HDD of the user PC 103.

Further, when the image data are transferred from the image input apparatus 101 to the user PC 103, the CPU of the user PC 103 executes the OS or dedicated software installed in the user PC 103. Then, the user PC 103 reads the image data stored in a storage area of an information storage device of the image input apparatus 101. Alternatively, the image data are transferred in such a manner that the OS or the dedicated software of the user PC 103 secures the storage area 107 according to a transfer command issued to the printer 102 by the image input apparatus 101, so as to enable the user PC 103 to receive the image data from the image input apparatus 101.

The image data transferred to the user PC 103 in this way are uploaded to the photosite 104 which is connected to the Internet 105 according to the following procedure.

The user PC 103 utilizes the Web browser 108 having a standard protocol, such as the http protocol, which enables information transfer through the Internet 105, and accesses the Web server device 109 of the photosite 104 by using the standard protocol.

Then, the user PC 103 displays information linked to multimedia information such as images and sounds, which are created by description languages such as HTML and XML and managed by the Web server device 109 of the photosite 104. With this operation, the user PC 103 is capable of receiving a service which is provided by the photosite 104 on the basis of the use of the Internet 105 as a communication infrastructure.

Next, the authentication for defining a user area in the photosite 104 is performed. A user ID and password inputted with the Web browser 108 of the user PC 103 are transferred to the photosite 104 according to a user request of the user PC 103.

Figure 2:
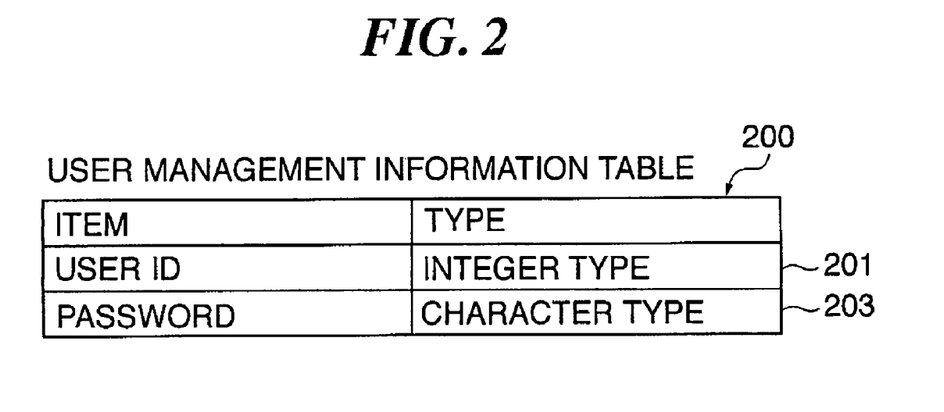
FIG. 2 is a view showing a user management information table stored in a user database of the photosite in FIG. 1.

The Web server device 109 of the photosite 104 determines whether or not the transferred user ID and password are coincident with a user ID 201 and a password 203 of a user management information table 200 stored in the user database 110.

When a user ID and password coincident with the transferred user ID and password are found in the user database 110, the Web server device 109 returns a response of success in the user authentication to the user PC 103. When a user ID and password coincident with the transferred user ID and password are not found in the user database 110, the Web server device 109 returns a response of failure in the user authentication to the user PC 103. Upon receipt of the response of failure in the user authentication, the user PC 103 makes the Web browser 108 display the response, and waits for a next instruction from the user. Upon receipt of the response of success in the user authentication, the user PC 103 proceeds to a next image uploading process.

Next, the image data photographed by the image input apparatus 101 and stored in the storage area 107 of the user PC 103 are transferred to the photosite 104 according to a request of the user of the user PC 103, (which transfer is hereinafter referred to as "the image uploading").

The image uploading may be performed in association with an image upload requiring action by selecting image data desired to be transferred from those displayed on the Web browser 108 as described above. Further, the image uploading may be directly performed by the above described software dedicated for the image uploading by selecting the image data with the use of the software dedicated for the image uploading.

In either case, the image uploading is performed on the basis of protocols such as http and ftp which are available on the Internet. A module performing a series of such operations in the photosite 104 is provided in the Web server device 109.

The Web server device 109 checks whether or not the uploaded image data are data which can be used in the photosite 104. When determining that the uploaded image data can be used in the photosite 104, the Web server device 109 stores the uploaded image in the image database 111. Further, the Web server device 109 stores attribute information and the like of the uploaded image in the attribute information database 112. At this stage, the Web server device 109 informs the user PC 103 that the image data is normally uploaded.

In the attribute information database 112, data of user attribute information registered in the photosite 104 are unitarily managed besides the above described attribute information of image data. It is possible for the user of the user PC 103 to browse the image data uploaded in this way via the Web browser 108. The uploaded image data may be managed as an album obtained by arranging a plurality of images as one unit.

The photosite 104 includes a function to register in the attribute information database 112 information about the image input apparatus 101 and the printer 102 which are owned by the owner user. The Web browser 108 of the user PC 103 displays an owned model information input screen prepared by the Web server device 109, so as to make the user input model names and the like of the image input apparatus 101 and the printer 102 which are owned by the user. The Web server device 109 receives the inputted owned model information from the user PC 103, and stores the owned model information in the user owned product information table of the user database 110.

The Web server device 109 provides useful information such as owned product related information for the owner user through the Web browser 108, according to the information in the user owned product information table of the user database 110. Further, the Web server device 109 is also capable of restricting the maximum capacity of images to be uploaded and the like according to the number of models owned by the user.

In the following, constitution examples of databases in the above described information processing system according to the present embodiment will be explained with reference to FIG. 2 to FIG. 8.

FIG. 2 is a view showing the user management information table 200 which is stored in the user database 110 of the photosite 104 in FIG. 1, and in which information about the user is stored.

In FIG. 2, the user management information table 200 manages information for authenticating the user, and is constituted of the user ID 201 and the password 203. Each user is uniquely managed by the user ID 201 which is uniquely assigned for each user.

Figure 3:
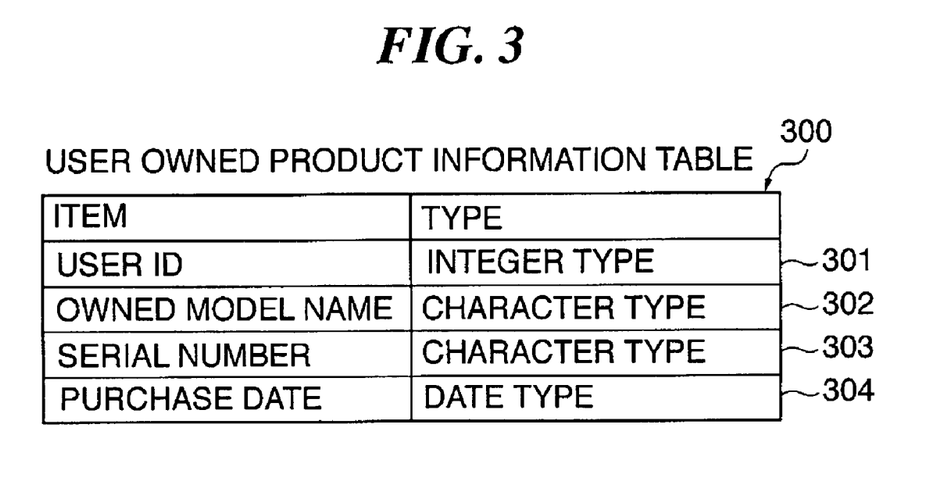
FIG. 3 is a view showing a user owned product information table stored in the user database of the photosite in FIG. 1.

FIG. 3 is a view showing a user owned product information table 300 stored in the user database 110 of the photosite 104 in FIG. 1.

In FIG. 3, the user owned product information table 300 is constituted of a user ID 301 which uniquely determines a user, an owned model name 302 which is various information of a model owned by the user, a serial number 303, and a purchase date 304.

Figure 4:
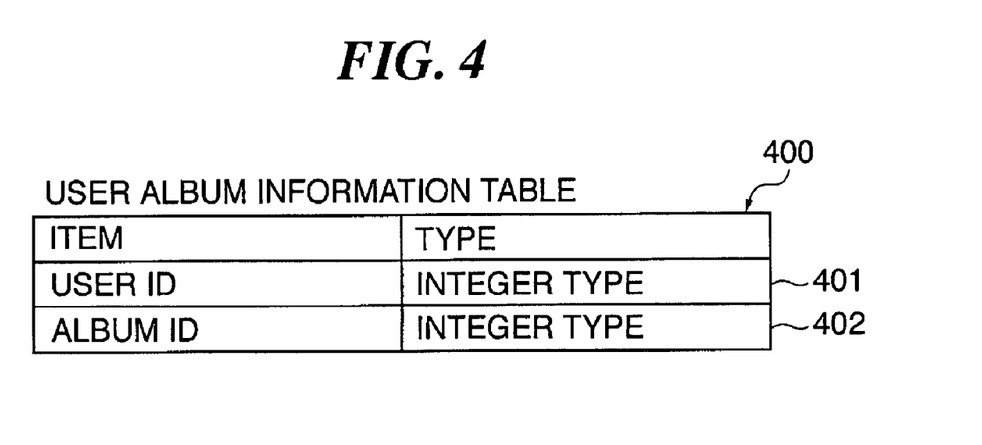
FIG. 4 is a view showing a user album information table stored in an image database of the photosite in FIG. 1.

FIG. 4 is a view showing a user album information table 400 which manages album information stored in the image database 111 of the photosite 104 in FIG. 1.

In FIG. 4, the user album information table 400 is constituted of a user ID 401 which uniquely determines a user, and an album ID 402 which uniquely determines an album for each user.

Figure 5:
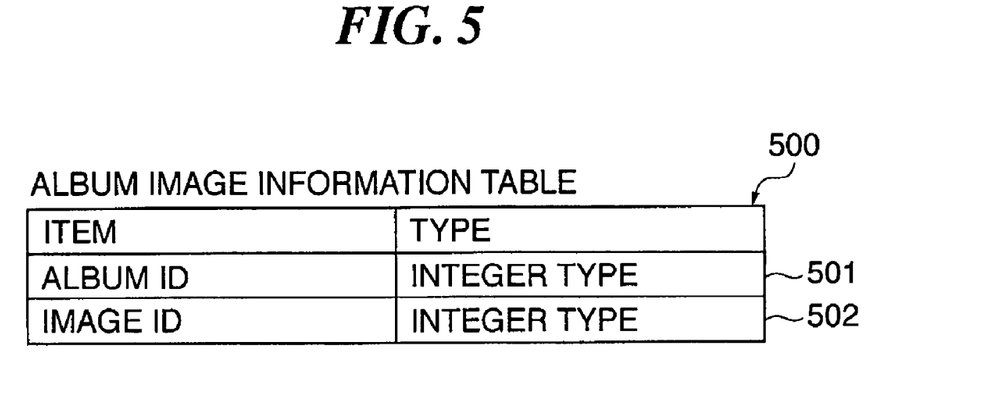
FIG. 5 is a view showing an album image information table stored in the image database of the photosite in FIG. 1.

FIG. 5 is a view showing an album image information table 500 stored in the image database 111 of the photosite 104 in FIG. 1.

In FIG. 5, the album image information table 500 is constituted of an album ID 501 which uniquely determines an album, and an image ID 502 which indicates an image stored in the album.

Figure 6:
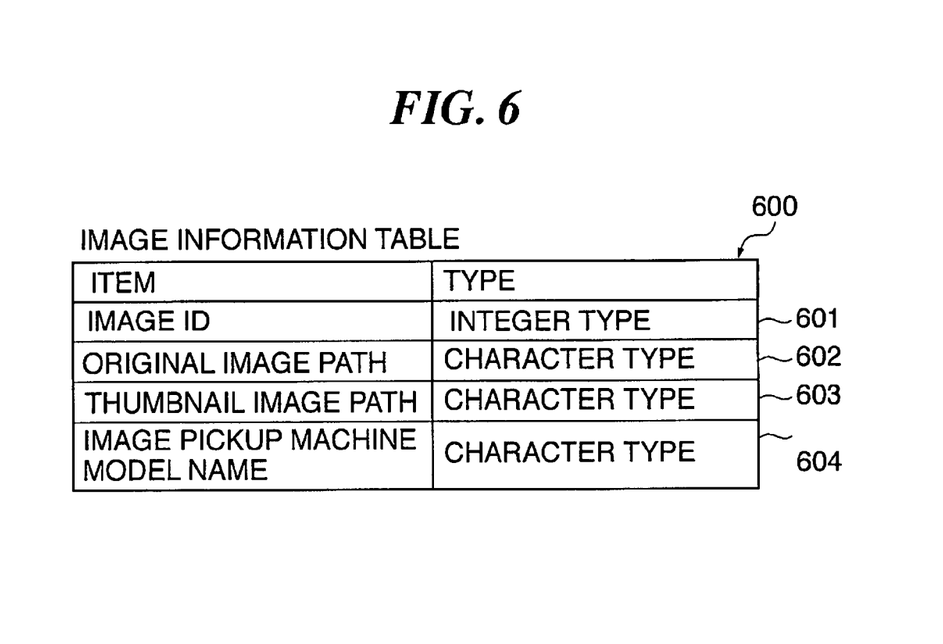
FIG. 6 is a view showing an image information table stored in an attribute information database of the photosite in FIG. 1.

FIG. 6 is a view showing an image information table 600 stored in the attribute information database 112 of the photosite 104 in FIG. 1.

In FIG. 6, the image information table 600 includes an image ID 601 which uniquely determines an image, and attribute information of the image. The attribute information of the image includes an original image path 602, a thumbnail image path 603, and a image-pickup machine model name 604.

Figure 7:
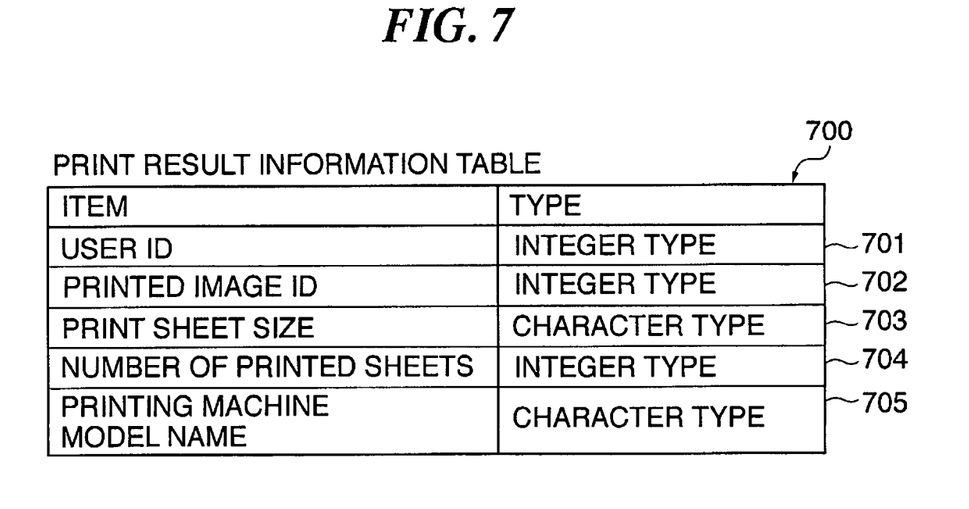
FIG. 7 is a view showing a print result information table stored in the attribute information database of the photosite in FIG. 1.

FIG. 7 is a view showing a print result information table 700 stored in the attribute information database 112 of the photosite 104 in FIG. 1.

In FIG. 7, the print result information table 700 includes a user ID 701 which uniquely determines a user who performed printing. Further, the print result information table 700 includes a printed image ID 702 which indicates a printed image, a print sheet size 703 which stores the sheet size used for the printing, the number of print sheets 704 which store the number of printed sheets, and a printing machine model name 705 which stores a model name of a machine used for the printing.

Figure 8:
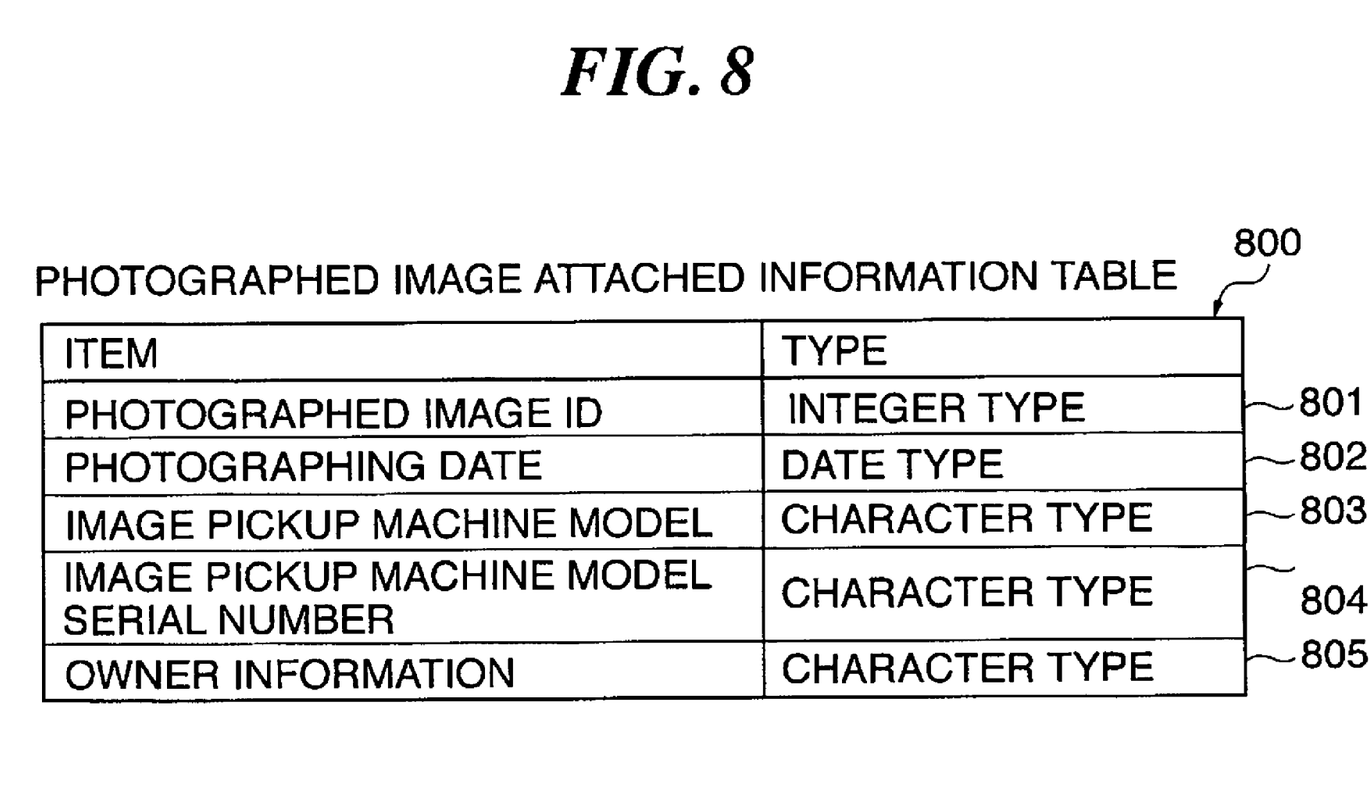
FIG. 8 is a view showing a photographed image attached information table stored in the attribute information database of the photosite in FIG. 1.

FIG. 8 is a view showing a photographed image attached information table 800 stored in the attribute information database 112 of the photosite 104 in FIG. 1.

In FIG. 8, the photographed image attached information table 800 includes a photographed image ID 801 which uniquely determines an image. Further, the photographed image attached information table 800 includes a photographing date 802 which stores a photographed date, a image-pickup machine model name 803 which stores a name of a machine model used for the photographing, a image-pickup machine model serial number 804 which stores a serial number of a machine model used for the photographing, and owner information 805 which stores an owner of a machine model used for the photographing. Each information of the photographing date 802, the image-pickup machine model name 803, the image-pickup machine model serial number, and the owner information 805 corresponds to, for example, image attached information managed as Exif information embedded in a JPEG image.

Figure 9:
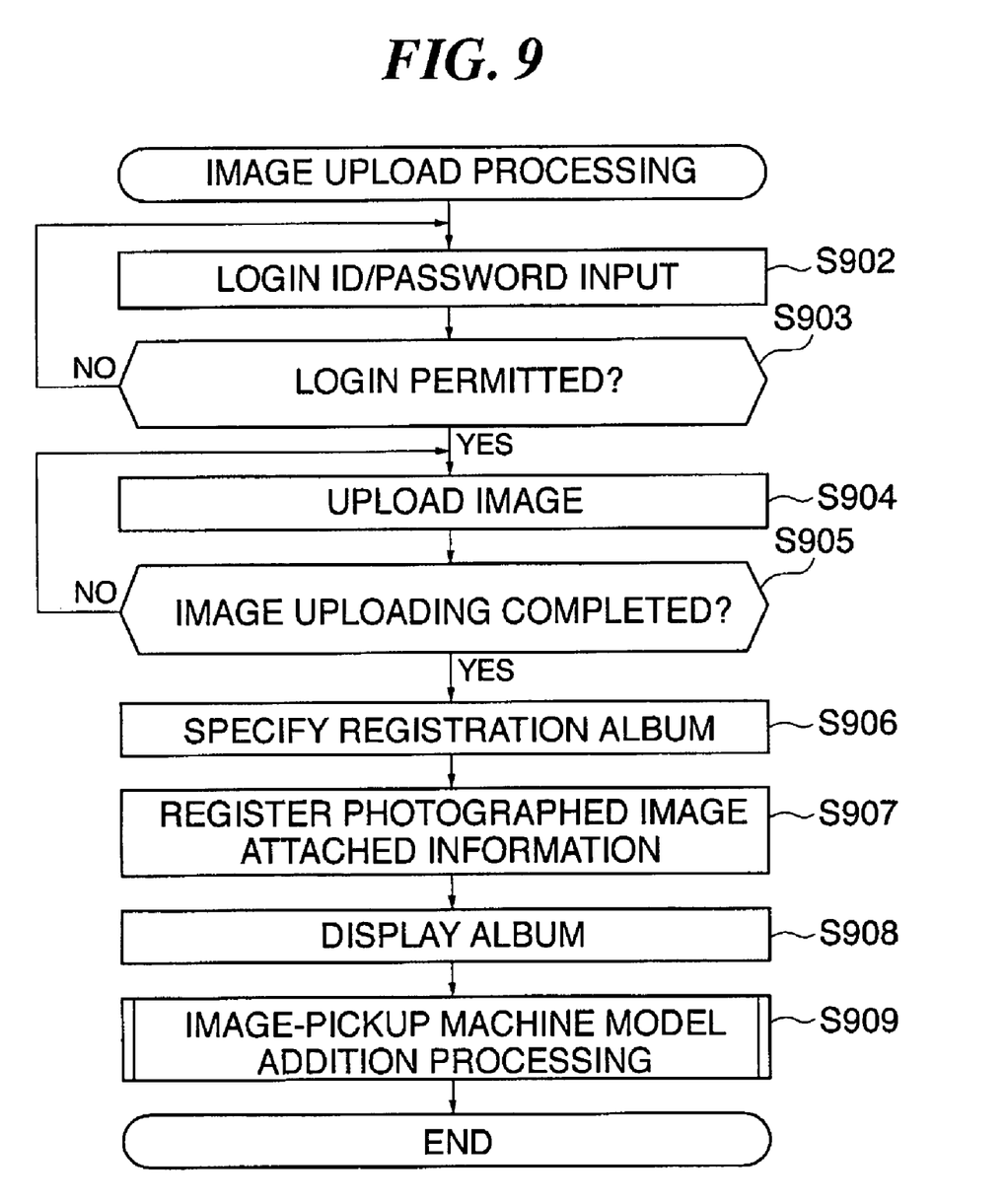
FIG. 9 is a flowchart showing a procedure of image upload processing performed by the information processing system in FIG. 1.

FIG. 9 is a flowchart showing a procedure of image upload processing performed by the information processing system in FIG. 1.

The processing is performed by the CPU of the Web server device 109 of the photosite 104 according to Web application programs.

Note that in the present embodiment, the user image data are managed by using, as a unit, an album obtained by arranging one or a plurality of images as a group, but the unit is not limited to this kind of group.

First, the user selects an image to be uploaded in the user PC 103. Further, the user starts the Web browser of the user PC 103 to access the photosite 104. The Web server device 109 of the photosite 104 transmits information for displaying a login screen to the user PC 103. Next, the user PC 103 displays the login screen on a display, so as to enable the user ID and password to be inputted through the login screen. The Web server device 109 receives the inputted user ID and password (step S902).

The Web server device 109 of the photosite 104 compares the transferred user ID and password with the user ID 201 and the password 203 of the user management information table 200 which are managed in the user database 110 (step S903).

When a user ID and password in the user management information table 200 which are coincident with the transferred user ID and password exist in step S903, the Web server device 109 determines to permit the login, and proceeds to step S904. When a user ID and password in the user management information table 200 which are coincident with the transferred user ID and password do not exist, the Web server device 109 determines not to permit the login, transmits a message indicating such determination to the user PC 103, and returns to the processing in step S902.

Next, the Web server device 109 receives the image uploaded from the user PC 103 (step S904). Then, the Web server device 109 determines whether or not there is an image to be further uploaded (step S905). When determining that there is no image to be further uploaded in step S905, the Web server device 109 proceeds to step S906. When determining that there is an image to be further uploaded in step S905, the Web server device 109 returns to the processing in step S904.

When determining that there is no image to be further uploaded, the Web server device 109 transmits to the user PC 103 Web page data for displaying a screen to make the user specify an album which stores the uploaded image (step S906). The Web server device 109 retrieves the specified album from the user album information table 400 and uniquely determines the album. Further, the Web server device 109 adds one record by using the determined album ID 402 as the album ID 501 of the album image information table 500. In this case, the Web server device 109 sets the image ID 502 to an integer obtained by adding one to a maximum value so as to make the image ID unique.

Next, the Web server device 109 adds one record by using the registered image ID 502 as the photographed image ID 801 of the photographed image attached information table 800 (step S907). In this case, the Web server device 109 extracts from the image attached information, such as Exif information, the photographing date 802, the image-pickup machine model name 803, the image-pickup machine model serial number 804, and the owner information 805, and stores the extracted information in the photographed image attached information table 800. Then, the Web server device 109 transmits to the user PC 103 Web page data for displaying the album in which the registered image is stored (step S908). Through the above described steps, the Web server device 109 completes the processing to upload an image to the user album. Then, the Web server device 109 performs photographing machine model addition processing (step S909), followed by terminating the image upload processing.

Figure 10:
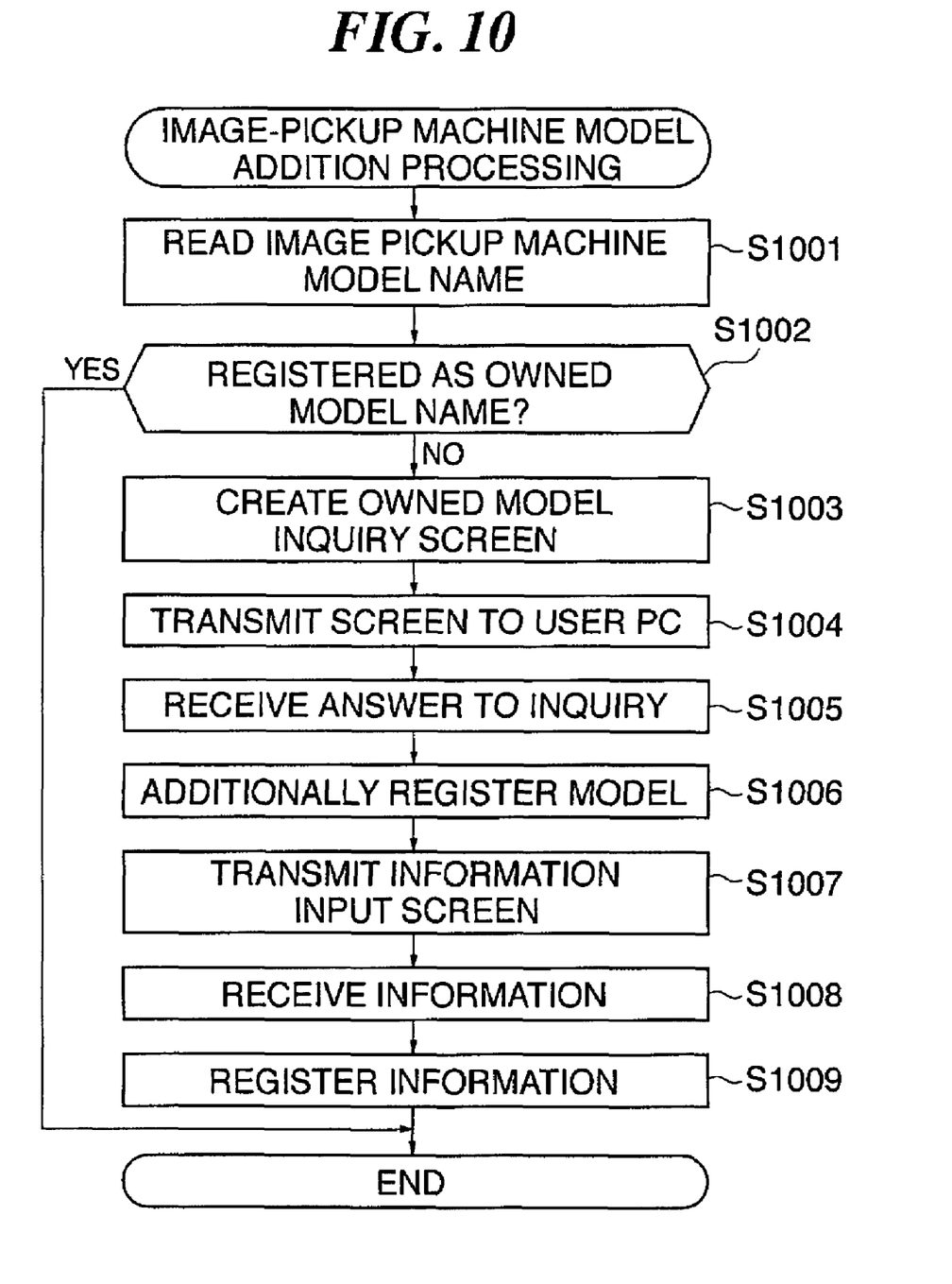
FIG. 10 is a flowchart showing a procedure of an example of image-pickup machine model addition processing performed in step S909 in FIG. 9.

FIG. 10 is a flowchart showing a procedure of an example of image-pickup machine model addition processing performed in step S909 in FIG. 9.

The flowchart in FIG. 10 shows, in the image-pickup machine model addition processing, a processing procedure to make the user determine whether or not the image-pickup machine model for the uploaded image is a user's owned model.

In FIG. 10, first, the Web server device 109 reads the image-pickup machine model name 803 from the photographed image attached information table 800 of the uploaded image (S1001).

The Web server device 109 determines whether or not the image-pickup machine model name 803 read in step S1001 exists in the owned model name 302 of the user owned product information table 300 (S1002). When determining in step S1002 that the read image-pickup machine model is not included in the table, the Web server device 109 creates Web page data for urging an input about whether or not the image-pickup machine model name 803 not included in the owned model name 302 is owned by the user (step S1003). The Web server device 109 transmits the created Web page data to the user PC 103 (step S1004). Thereby, the user PC 103 displays an inquiry screen about whether or not the image-pickup machine model is owned by the user, so that the user selects and inputs an answer according to the screen. The Web server device 109 receives the answer inputted on the screen from the user PC 103 (step S1005).

When it is answered from the user PC 103 that the image-pickup machine model is owned by the user, the Web server device additionally registers the image-pickup machine model name 803 to the owned model name 302 in the user owned product information table 300 (step S1006). Note that information in the photographed image attached information table 800 may be copied to the user owned product information table 300.

In step S1007, the Web server device 109 transmits to the user PC 103 Web page data for displaying a screen to urge the user to input other information necessary for the user owned product information table 300. The other information includes, for example, the purchase date 304 of the product.

Note that since the photographed image attached information table 800 is an example, when it is assumed, for example, that the image-pickup machine model serial number 804 is not registered, it is also conceivable to urge the user to input the serial number. Alternatively, if the purchase date can be extracted from the photographed image attached information table 800, it is also conceivable to copy the purchase date as the purchase date 304.

The Web server device 109 receives from the user PC 103 the information inputted by the user according to the screen displayed on the basis of the Web page data transmitted in step S1007 (S1008). The Web server device 109 registers the received information in the user owned product information table 300 (S1009).

According to the above described first embodiment of the present invention, the image-pickup machine model name is extracted from the photographed image attached information of the uploaded image and registered as the user owned model as required, as a result of which it is possible for the user to easily register the user owned model together with the image uploading.

A second embodiment according to the present invention, in which the registration of the user owned model is performed by further reducing user's input operations, will be described below with reference to FIG. 11. In the following, the explanation about the same parts as in the first embodiment is omitted, and a part characterized by the second embodiment is particularly explained in detail.

Figure 11:
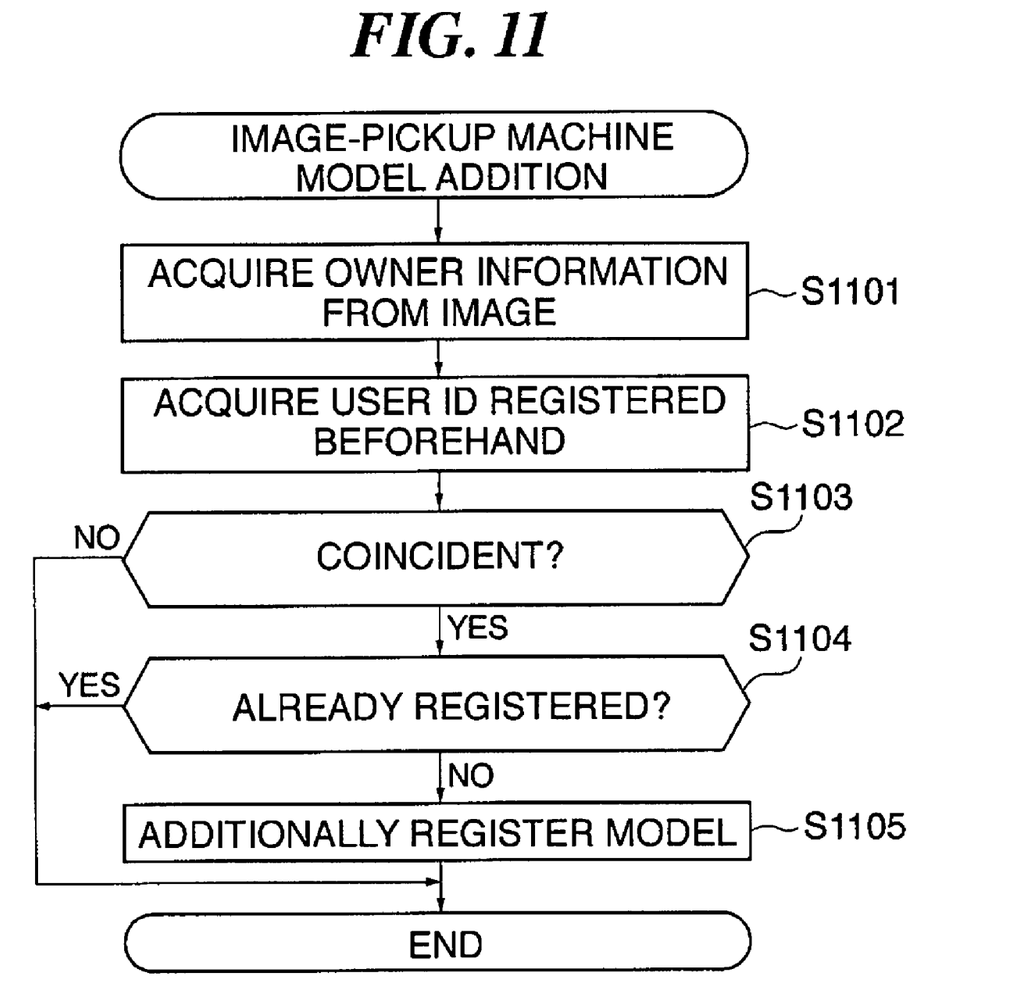
FIG. 11 is a flowchart showing a procedure of another example of image-pickup machine model addition processing performed in step S909 in FIG. 9.

FIG. 11 is a flowchart showing a procedure of another example of the image-pickup machine model addition processing performed in step S909 in FIG. 9. In the following, a part different from the first embodiment according to the present invention is particularly explained in detail.

Note that in the second embodiment according to the present invention, it is assumed that the image input apparatus 101 holds the user ID beforehand, and the user ID is included in the information attached to the uploaded image as the owner information. Thus, in step S907, the Web server device 109 registers the user ID of the uploaded image in the photographed image attached information table 800 as the owner information 805.

In FIG. 11, first, the Web server device 109 acquires the owner information 805 registered in the photographed image attached information table 800 (step S1101). Next, the Web server device 109 acquires the user ID 201 in the user management information table 200 (step S1102).

Then, the Web server device 109 compares the owner information 805 acquired by the processing in step S1101 with the user ID 201 acquired by the processing in step S1102 (step S1103). When determining that there is a user ID coincident with the owner information in the user management information table, the Web server device 109 proceeds to step S1104. On the other hand, when determining that there is no user ID coincident with the owner information in the table, the Web server device 109 terminates the processing.

In step S1104, the Web server device 109 determines whether or not a record having the user ID determined to be coincident with the owner information and the image-pickup machine model name 803 exists in the user owned product information table 300. When determining that such a record exists in step S1104, the Web server device 109 terminates the processing because the record need not be additionally registered as a new user owned model. When determining in step S1104 that such a record does not exist, the Web server device 109 proceeds to step S1105 so as to additionally register the record as a new user owned model.

In step S1105, the Web server device 109 copies and registers the information in the photographed image attached information table 800 to the user owned product information table 300.

According to the processing shown in FIG. 11, the Web server device 109 additionally registers the image-pickup machine model name as a user owned model on the basis of the owner information in the information attached to the uploaded image, as a result of which it is not necessary for the user to perform specific operations.

Next, as a third embodiment according to the present invention, processing for registering information on a printing device owned by the user in the user owned product information table is explained with reference to FIG. 12. The processing is performed in a manner that the CPU of the Web server device 109 of the photosite 104 operates according to the OS and the Web applications. Note that in the following, explanation of the same part as in the first and second embodiments according to the present invention is omitted, a part characterized by the present third embodiment is particularly explained in detail.

Figure 13:
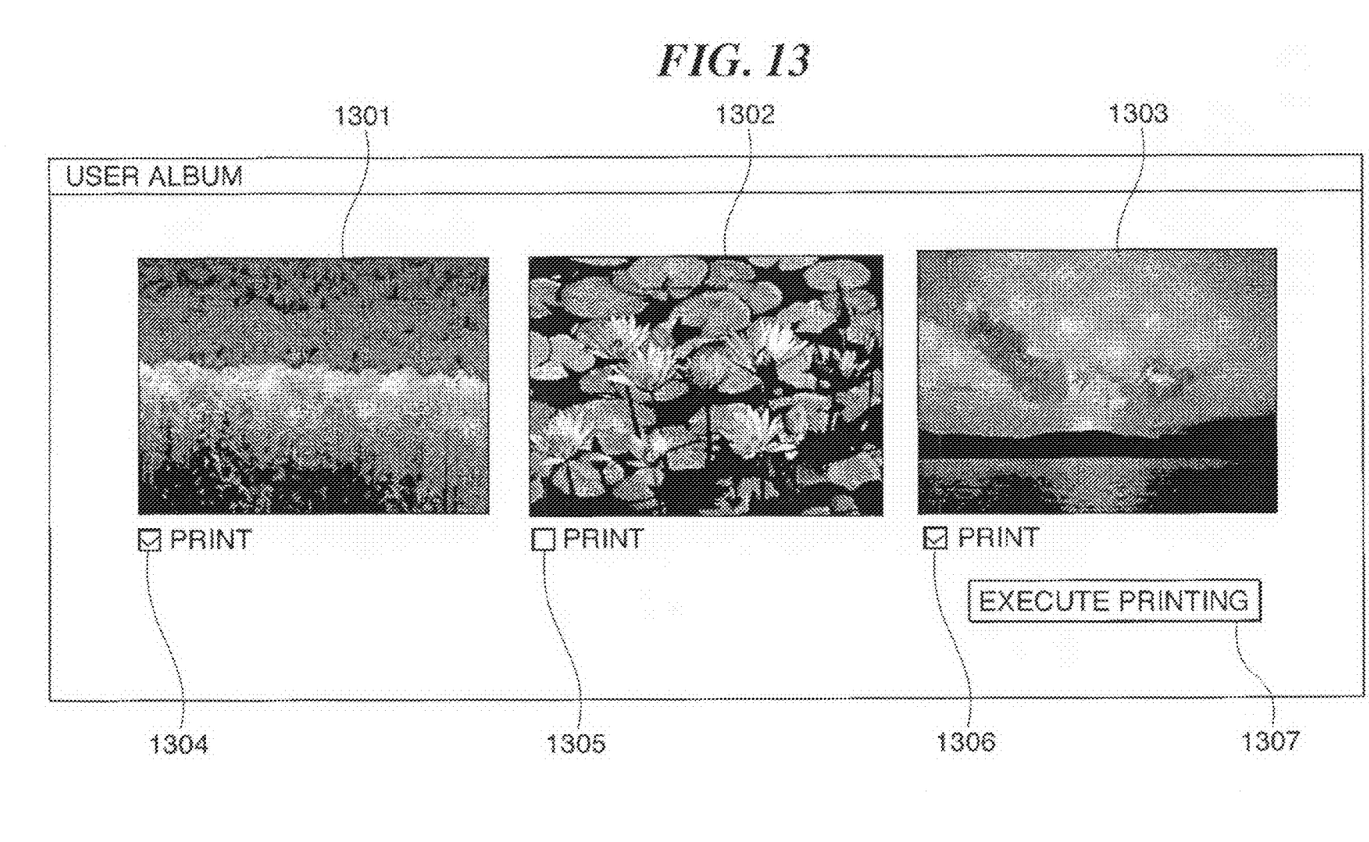
FIG. 13 is a view showing an example of a user browser when local printing is performed in the information processing system in FIG. 1.

First, an example in which an uploaded image is printed by the printer 102 connected to the local environment of the user PC 103 is explained with reference to FIG. 13.

The owner user authenticated as described above by the Web server device 109 browses images 1301, 1302 and 1303 managed by the photosite 104, with the Web browser 108 of the user PC 103. The user selects an image to be subjected to the local printing by using check boxes 1304, 1305 and 1306 on the Web browser 108, and depresses a print execution button 1307 arranged on the Web browser 108.

The Web server device 109 acquires an original image path of the specified image from the image information table of the image database 111. Then, by referring to the original image path, the Web server device 109 acquires the original image as an image to be printed and transmits the image to the user PC 103. The printing module stored in the storage area 107 of the user PC 103 transmits a print instruction of the image to be printed to the printer 102.

The printer 102 outputs a printed matter 113 according to the print instruction. The printer 102 communicates to the user PC 103 that the printing operation is completed. Then, when receiving the completion of the printing from the printer 102 by using the printing module, the user PC 103 creates print result information indicating the model information of the printer 102.

The user PC 103 transfers the print result information to the photosite 104. When receiving the print result information, the Web server device 109 stores the received print result information in the print result information table of the user database 110.

In the following, the processing performed by the Web server device 109 after receiving the new print result information as described above, is explained with reference to FIG. 12.

Figure 12:
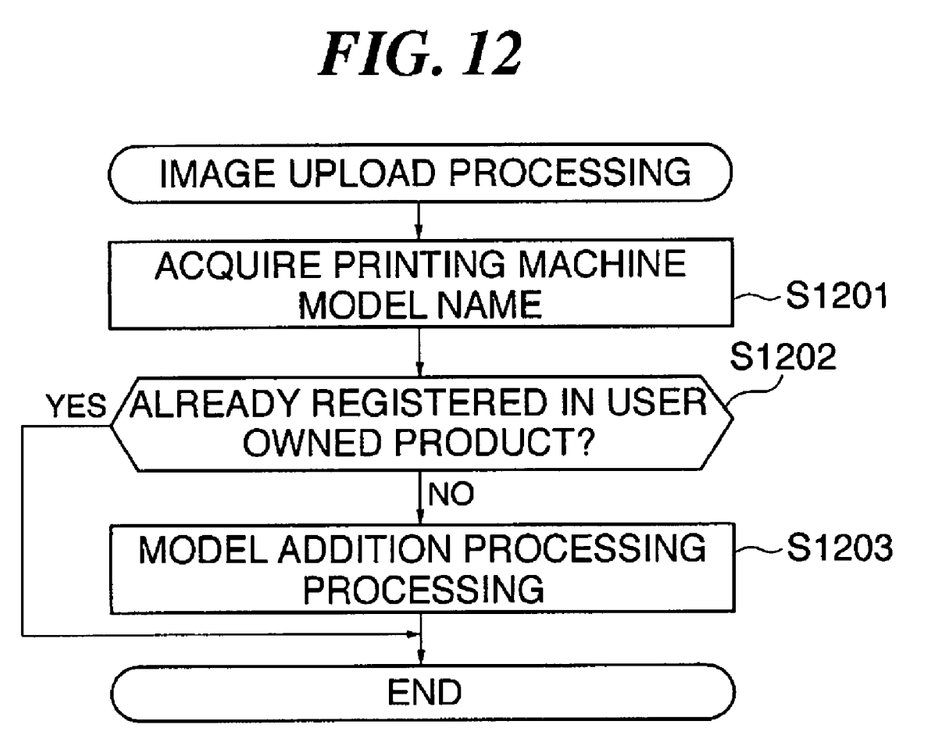
FIG. 12 is a flowchart showing a procedure of image upload processing performed by the information processing system in FIG. 1.

In FIG. 12, first, the Web server device 109 acquires the printing machine model name 705 stored in the print result information table 700 (step S1201). Next, the Web server device 109 compares the printing machine model name 705 in the print result information table 700 indicating the owned model used for the local printing with the user owned product information table 300. Then, the Web server device 109 determines whether or not the owned model name 302 coincident with the printing machine model name 705 exists (step S1202).

As a result of the determination in step S1202, when a coincident owned model name exists the Web server device 109 terminates the processing because the printing machine model name need not be added as a user owned model. When no coincident owned model name exists, the Web server device 109 proceeds to step S1203 so as to register the printing machine model name as a user owned model.

In step S1203, the Web server device 109 urges the user to input information necessary for the user owned product information table 300. The Web server device 109 automatically registers in the user ID 301, the user ID uniquely defined when the image is uploaded, and also registers in the owned model name 302, the printing machine model name 705 as it is. Then, the Web server device 109 urges the user to input the serial number 303 and the purchase date 304.

Note that since the print result information table 700 is an example, if the printing machine model serial number and the purchase date can be extracted from the print result information table 700, it is also conceivable to automatically register the number and the purchase date as the serial number 303 and the purchase date 304. When completing the printing machine model addition processing, the Web server device 109 terminates the present processing in step S1203.

According to the processing shown in FIG. 12, it is possible to extract the printing machine model name from the print result information at the time of the local printing of an uploaded image (step S1201), and to register the extracted printing machine model name as a user owned model as required (S1203).

As described above, according to the third embodiment, the printing device owned by the user can be easily registered on the Web.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed the embodiments. The scope of the following claims is to be accorded the broadest interpretation so as to encompass all such modifications and equivalent structures and functions.

This application claims the benefit of Japanese Patent Application No. 2006-144252, filed May 24, 2006 which is hereby incorporated by reference herein in its entirety.

What is claimed is:

1. An image management apparatus comprising:
 a registering unit adapted to register a user ID in correspondence with model information on an image-pickup device;
 a receiving unit adapted to receive the user ID from a user terminal;
 a user determining unit adapted to determine whether or not uploading of an image from the user terminal is permitted, on the basis of the user ID received by the receiving unit and the user ID registered in the registering unit;
 a storing unit adapted, when the uploading of the image is permitted, to store the image uploaded from the user terminal;
 an acquiring unit adapted to acquire model information on an image-pickup device used for photographing the image stored in the storing unit from attribute information of the image; and
 a model determining unit adapted to determine whether or not model information corresponding to the model information acquired by the acquiring unit is registered in the registering unit in correspondence with the user ID received by the receiving unit,
 wherein when the model information is not registered in the registering unit, the registering unit further registers the model information acquired by the acquiring unit in correspondence with the user ID received by the receiving unit.

2. An image management apparatus according to claim 1, further comprising:
 a notifying unit adapted, when the model determining unit determines that the model information is not registered in the registering unit, to notify the user terminal of the model information acquired by the acquiring unit; and
 a selecting unit adapted to select whether or not to register the informed model information in the registering unit, according to an instruction from the user terminal,
 wherein when the selecting unit selects to register the notified model information in the registering unit, the registering unit further registers the model information acquired by the acquiring unit in correspondence with the user ID received by the receiving unit.

3. An image management apparatus according to claim 1, further comprising:
 a print instruction receiving unit adapted to receive a print instruction of the image stored in the storing unit from the user terminal;
 a downloading unit adapted to download the image instructed to be printed to the user terminal; and
 a print result receiving unit adapted to receive print result information of the downloaded image from the user terminal,
 wherein the registering unit further registers model information on a printing device included in the received print result information, in correspondence with the user ID received by the receiving unit.

4. An image management method comprising:
 a registering step of registering a user ID in correspondence with model information on an image-pickup device;
 a user ID receiving step of receiving the user ID from a user terminal;
 a determining step of determining whether or not uploading of an image from the user terminal is permitted, on the basis of the received user ID and the registered user ID;
 a storing step of, when the uploading of the image is permitted, storing the image uploaded from the user terminal;
 an acquiring step of acquiring model information on an image-pickup device used for photographing the stored image from attribute information of the image;
 a model determining step of determining whether or not model information corresponding to the acquired model information is already registered in correspondence with the received user ID; and
 a registering step of, when the model information corresponding to the acquired model information is not registered, further registering the acquired model information in correspondence with the received user ID.

5. A computer program stored on a computer-readable storage medium, when executed, for causing a computer to perform an image management method, the image management method comprising:
 a registering step of registering a user ID in correspondence with model information on an image-pickup device;
 a user ID receiving step of receiving the user ID from a user terminal;
 a determining step of determining whether or not uploading of an image from the user terminal is permitted, on the basis Of the received user ID and the registered user ID;
 a storing step of, when the uploading of the image is permitted, storing the image uploaded from the user terminal;
 an acquiring step of acquiring model information on an image-pickup device used for photographing the stored image from attribute information of the image;
 a model determining step of determining whether or not model information corresponding to the acquired model information is already registered in correspondence with the received user ID; and
 a registering step of, when the model information corresponding to the acquired model information is not registered at the model determining step, further registering the acquired model information in correspondence with the received user ID.

6. A computer-readable storage medium storing a program according to claim 5.

* * * * *